J. HUBER & H. SNELL.
COMBINED HAY-TEDDER AND SIDE-RAKE.

No. 186,346. Patented Jan. 16, 1877.

WITNESSES:

INVENTORS.
John Huber
BY Henry Snell

ATTORNEYS.

UNITED STATES PATENT OFFICE.

JOHN HUBER AND HENRY SNELL, OF GIRARD, ILLINOIS.

IMPROVEMENT IN COMBINED HAY-TEDDER AND SIDE RAKE.

Specification forming part of Letters Patent No. 186,346, dated January 16, 1877; application filed December 11, 1875.

*To all whom it may concern:*

Figure 1:
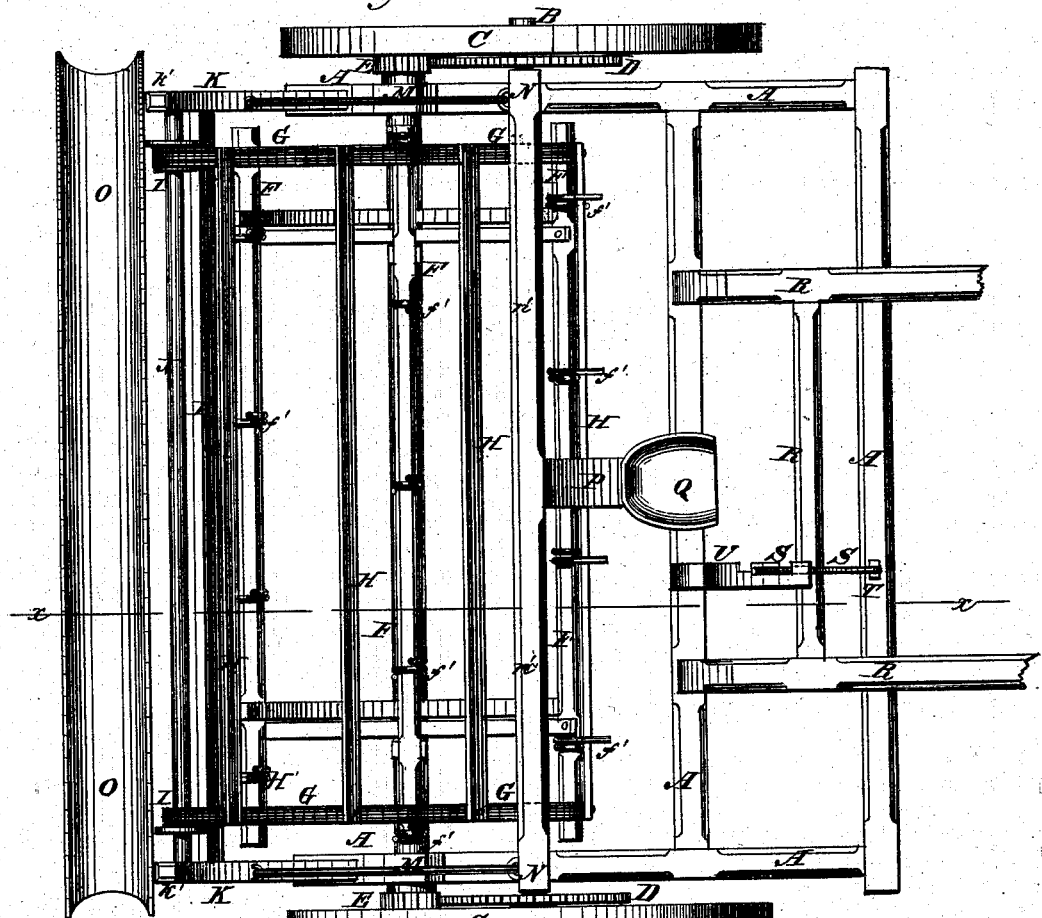
Figure 2:
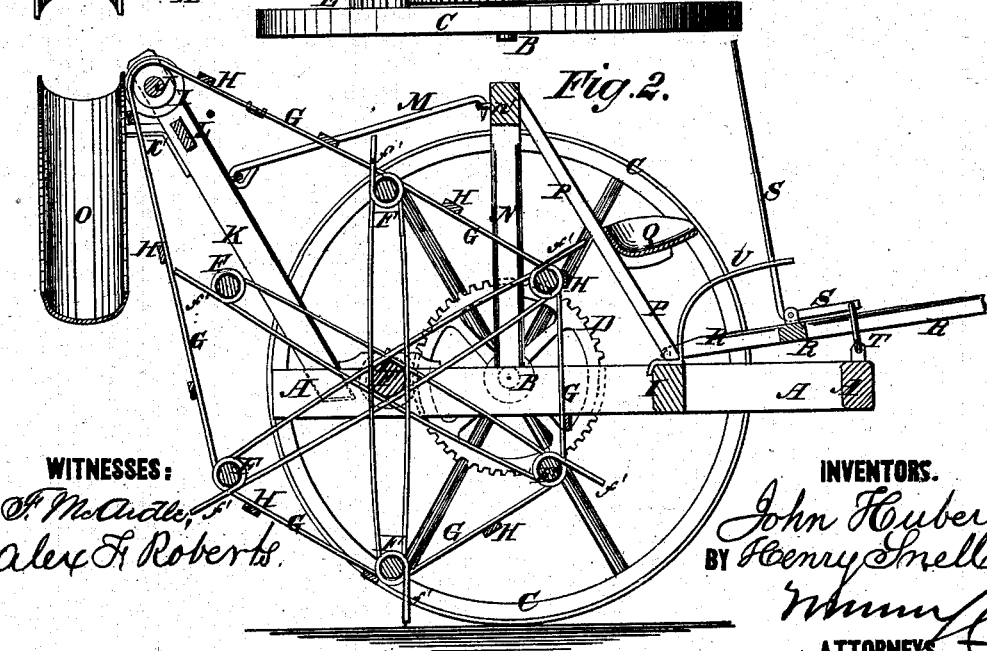

Be it known that we, JOHN HUBER and HENRY SNELL, of Girard, in the county of Macoupin, and State of Illinois, have invented a new and useful Improvement in Combined Hay-Tedder and Side Rake, of which the following is a specification:

Figure 1 is a top view of our improved machine. Fig. 2 is a vertical longitudinal section of the same, taken through the line $x\ x$, Fig. 1.

Similar letters of reference indicate corresponding parts.

The object of this invention is to furnish an improved machine, which shall be so constructed that it may be used simply for stirring up and turning the hay, or for turning the hay and gathering it into windrows, and which shall be simple in construction, convenient in use, and effective in operation in either capacity.

The invention will first be described in connection with drawing, and then pointed out in claim.

A is the frame of the machine, which consists of two side bars, connected at their forward parts by two cross-bars. To the side bars of the frame A, in the rear of the rear cross-bar, are attached two short axles, B, upon which revolve the wheels C. To the inner sides of the wheels C are rigidly attached gear-wheels D, into the teeth of which mesh the teeth of the smaller gear-wheels E, attached to the shaft of the reel F. The shaft of the reel F revolves in bearings attached to the side bars of the frame A near their rear ends. To the bars of the reel F are attached spring-teeth $f'$, which, as the machine is drawn forward, take hold of the hay, carry it up and over the reel, and drop it to the ground in the rear of the machine. G are belts or chains, which pass around the end parts of the arms of the reel F, and which are connected by a number of cross-bars, H. The belts G also pass around pulleys I, attached to a shaft, J, which revolves in bearings in the upper ends of the detachable standards K. The standards K are connected, a little below the shaft J, by a cross-bar, L, and their lower ends, or tenons formed upon said lower ends, enter mortises or sockets in the rear ends of the side bars of the frame C. The detachable standards K are braced and supported against the draft of the carrier G H by the hook-braces M, the rear ends of which are pivoted to the upper parts of said standards K, and their forward ends are hooked into eyes or staples, attached to the upper parts of the standards N. The lower ends of the standards N are rigidly attached to the side bars of the frame A, and their upper ends are connected by a cross-bar, $n'$. O is an inclined spout or trough, attached to brackets $k'$, secured to the detachable standards K.

With this construction the carrier G H takes the hay from the teeth $f'$, when it has been brought to the top of the reel F, carries it over the shaft J, and discharges it into the trough O, down which it slides, and is deposited in a windrow along one side of the path of the machine.

P is a bar, the upper end of which is attached to the middle part of the cross-bar $n'$, and its lower end to the inner cross-bar of the frame A. To the inclined bar P is attached the driver's seat Q, so that the weight of the driver may balance the weight of the rear part of the machine. R are the thills, which are hinged to the inner cross-bar of the frame A. To the cross-bar of the thills R is pivoted the angle of the bent lever S, the end of the short arm of which is connected with the forward cross-bar of the frame A by a link, rod, or chain, T. The long arm of the lever S projects into such a position that it may be conveniently reached and operated by the driver from his seat. The long arm of the lever S crosses a toothed or notched bar, U, attached to the frame A, to receive and hold the said lever in any position into which it may be adjusted. By this construction, by operating the lever S the reel F may be lowered into working position, or raised away from the ground, as may be desired.

In order to use my machine as a tedder, I undo the endless belt, and detach the chute, leaving the toothed reel to be run by the cog-wheel attached to the driving-wheel.

Having thus described our invention, we claim as new, and desire to secure by Letters Patent—

The combination of the carrier G H, the pulleys and shaft I J, the detachable standards K, the hook braces M, and the inclined trough O, with the toothed reel F $f$ and the frame A, substantially as herein shown and described.

JOHN HUBER.
HENRY SNELL.

Witnesses:
    BALFOUR COWEN,
    PERRIN KENT.